US008578982B2

(12) United States Patent
Lee et al.

(10) Patent No.: US 8,578,982 B2
(45) Date of Patent: Nov. 12, 2013

(54) SCANNER RESISTANT DEVICE FOR RFID CARDS

(76) Inventors: Victor Lee, Chino Hills, CA (US); Eric Cohen, Miami, FL (US)

( * ) Notice: Subject to any disclaimer, the term of this patent is extended or adjusted under 35 U.S.C. 154(b) by 236 days.

(21) Appl. No.: 13/217,356

(22) Filed: Aug. 25, 2011

(65) Prior Publication Data

US 2013/0000801 A1    Jan. 3, 2013

Related U.S. Application Data

(60) Provisional application No. 61/501,755, filed on Jun. 28, 2011, provisional application No. 61/507,598, filed on Jul. 14, 2011.

(51) Int. Cl.
 *A45C 11/00* (2006.01)
 *B23P 17/04* (2006.01)
 *H05K 9/00* (2006.01)

(52) U.S. Cl.
 USPC ............................. 150/147; 29/428; 361/816

(58) Field of Classification Search
 USPC ............................. 150/147; 361/816; 29/428
 See application file for complete search history.

(56) References Cited

U.S. PATENT DOCUMENTS

| | | | | |
|---|---|---|---|---|
| 4,593,736 A * | 6/1986 | Morita | ............................ | 150/147 |
| 4,851,610 A * | 7/1989 | LeBlanc et al. | ............... | 174/353 |
| 5,713,406 A * | 2/1998 | Drury | ............................ | 150/132 |
| 5,941,375 A * | 8/1999 | Kamens et al. | ................. | 206/38 |
| 6,121,544 A * | 9/2000 | Petsinger | ....................... | 174/353 |
| 6,845,863 B1 * | 1/2005 | Riley | ............................... | 206/39 |
| 7,083,083 B2 * | 8/2006 | Droz | ............................... | 235/375 |
| 7,635,089 B2 * | 12/2009 | Augustinowicz et al. | .... | 235/486 |
| 7,889,056 B2 | 2/2011 | Horne | | |
| 2005/0061889 A1 * | 3/2005 | McGee et al. | ................ | 235/487 |
| 2006/0017573 A1 * | 1/2006 | Noguchi | .................... | 340/572.8 |
| 2007/0289775 A1 | 12/2007 | Potts et al. | | |
| 2009/0260731 A1 * | 10/2009 | Roth et al. | ..................... | 150/147 |
| 2011/0048594 A1 * | 3/2011 | Arnone | .......................... | 150/147 |

FOREIGN PATENT DOCUMENTS

| | | |
|---|---|---|
| EP | 1852808 A1 | 11/2007 |
| JP | 63281980 A * | 11/1988 |
| JP | 2006053761 A | 3/2006 |
| JP | 2006248060 A * | 9/2006 |
| JP | 2006313482 A | 11/2006 |

* cited by examiner

*Primary Examiner* — Sue A Weaver

(74) *Attorney, Agent, or Firm* — Mark Terry

(57) ABSTRACT

A device for protecting one or more credit or charge cards from radio frequency scanning is disclosed. The device comprises a planar element sized for fitting within a card slot of a personal carrying accessory, wherein the planar element is composed of an uncharged, conductive material and wherein the planar element inhibits the transmission of radio frequency signals.

13 Claims, 7 Drawing Sheets

SCANNER RESISTANT DEVICE FOR RFID CARDS

CROSS-REFERENCE TO RELATED APPLICATIONS

This patent application claims priority to provisional patent application 61/501,755 titled "Scanner Resistant Device for RFID Cards" and filed Jun. 28, 2011 and provisional patent application 61/507,598 titled "Scanner Resistant Device for RFID Cards" and filed Jul. 14, 2011. The subject matter of provisional patent application 61/501,755 and provisional patent application 61/507,598 is incorporated herein in its entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The invention disclosed broadly relates to the field of electronic commerce, and more particularly relates to the field of RFID cards used in electronic commerce.

BACKGROUND OF THE INVENTION

Radio-frequency identification (RFID) is a technology that uses radio waves to transfer data from an electronic tag, called an RFID tag or label, attached to an object, through a reader for the purpose of identifying and tracking the object. RFID technology has been used for many applications, including key entry cards, passports, road toll fee payments, identification cards, and cash transaction cards, such as credit and charge cards. RFID technology typically includes embedding a card or device with a microchip that stores certain information, such as passwords, identifiers, personal information or records of user transactions. The technology has become so popular, that many credit card issuers have started using RFID technology as a replacement for traditional magnetic strip credit cards.

Passive RFID tags (those without a battery) can be read if passed within close enough proximity to an RFID reader or scanner. It is not necessary to "show" the tag to the reader or scanner device, as with a bar code. In other words it does not require line of sight to "see" an RFID tag, the tag can be read inside a wallet, purse, case, carton, box or other container, and unlike barcodes, RFID tags can be read hundreds at a time. Some RFID tags can be read from several meters away and beyond the line of sight of the reader.

RFID technology, however, has come with drawbacks. The private information stored on RFID cards are easier targets for potential identity thieves and "electronic pickpockets." A potential identity thief or electronic pickpocket can use an RFID scanner to read the private information stored on an RFID card, even when it is stored in a wallet, purse or pocket. The potential thief needs only to hold a handheld RFID scanner in close proximity to the wallet or purse in order to read the private information contained in the RFID card. This has caused concern in the financial and security industries.

Consequently, a need exists to overcome the problems with the prior art as discussed above, and particularly for a more efficient way of protecting the data on RFID cards.

SUMMARY OF THE INVENTION

Briefly, according to an embodiment of the present invention, a device for protecting one or more credit or charge cards from radio frequency scanning is disclosed. The device comprises a planar element sized for fitting within a card slot of a personal carrying accessory, wherein the planar element is composed of an uncharged, conductive material and wherein the planar element inhibits the transmission of radio frequency signals.

In another embodiment, method for preventing radio frequency scanning of a card is disclosed. The method includes placing a first planar element within a first card slot of a personal carrying case such that the first planar element is located substantially on a front side of the card, wherein the planar element is sized for fitting within a card slot of the personal carrying accessory, wherein the planar element is composed of an uncharged, conductive material and wherein the planar element inhibits the transmission of radio frequency signals and placing a second planar element within a second card slot of the personal carrying case such that the second planar element is located substantially on a rear side of the card, and wherein the second planar element shares the same characteristics of the first planar element.

In another embodiment, system for preventing radio frequency scanning of a card is disclosed. The system includes a personal carrying case comprising a plurality of card slots for inserting cards; a card including information that may be scanned via a radio frequency scanner; a first planar element located within a first card slot of the personal carrying case such that the first planar element is located substantially on a front side of the card, wherein the planar element is sized for fitting within a card slot of the personal carrying accessory, wherein the planar element is composed of an uncharged, conductive material and wherein the planar element inhibits the transmission of radio frequency signals; and a second planar element located within a second card slot of the personal carrying case such that the second planar element is located substantially on a rear side of the card, and wherein the second planar element shares the same characteristics of the first planar element.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings.

DETAILED DESCRIPTION

The present invention solves the problems with the prior art by providing a small, inexpensive and lightweight device that prevents surreptitious scanning of RFID cards and that can be placed within an existing personal carrying case, such as a wallet, purse, handbag, holder or other type of carrying device. RFID cards that may be protected include credit cards, charge cards, identification cards, security tokens, pass cards, entry cards, passports, badges, etc. The present invention is advantageous since it allows for the use of existing personal carrying cases and does not require the purchase of new carrying cases that prevent scanning. The present is further advantageous since it is manufactured from lightweight, durable material that remains effective for extended periods of time.

Figure 1:
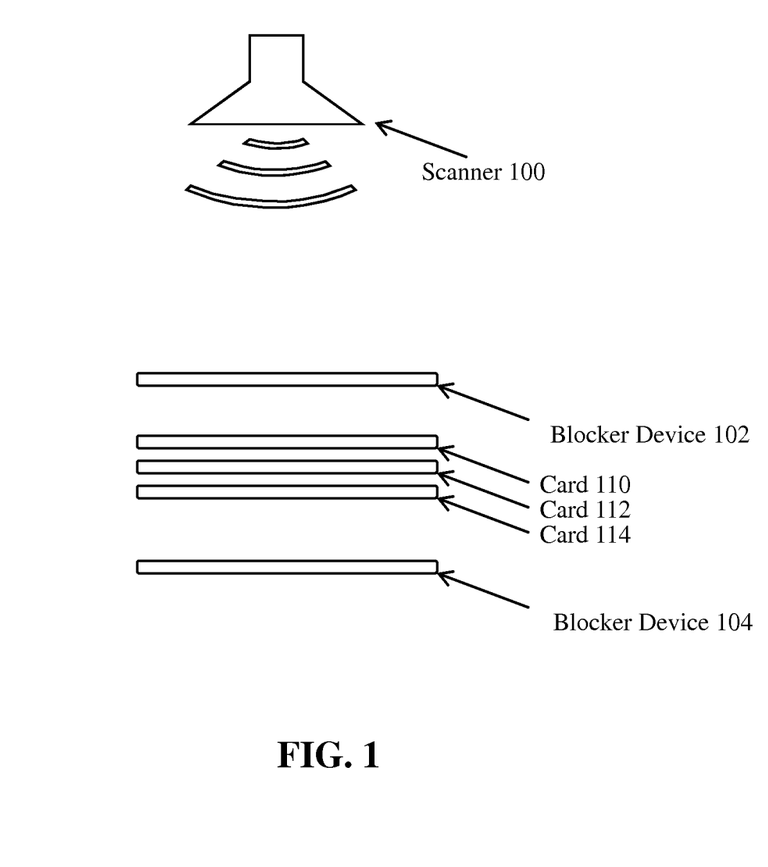
FIG. 1 is an illustration of a system that provides a scanner resistant device or devices for RFID cards, according to one embodiment of the present invention.

FIG. 1 is an illustration of a system that provides scanner resistant devices 102, 104 for RFID cards 110, 112 and 114, according to one embodiment of the present invention. FIG. 1 is a side view, which shows scanner resistant devices 102, 104 surrounding RFID cards 110, 112 and 114, so as to prevent the scanner 100 from scanning the data present in the RFID cards 110, 112 and 114 due to the conductive material of scanner resistant devices 102, 104.

Each of the devices 102, 104, also called a "blocker device," prevents the transmission of radio frequency signals through its surface. Each blocker device may be composed of an uncharged, conductive material, such as a dielectric metal or metal alloy. Alternative materials for each blocker device include aluminum, steel, iron, tin, copper, chromium, nickel, brass and stainless steel. In another alternative, the blocker devices are composed of a metallic foil material layer, such as aluminum foil, that is laminated or covered on both sides with a layer of plastic material, such as PVC or ABS plastic. A laminate is a material that can be constructed by uniting two or more layers of material together. The process of creating a laminate is lamination, which in common parlance refers to the placing of something between layers of plastic and gluing them with heat and/or pressure, usually with an adhesive. The laminating process may be pouch lamination or heated roll lamination. In one embodiment of the present invention, each blocker device includes printed information, such as advertising, logos, artwork, promotional materials or contact information, on at least one of its surfaces.

In one embodiment, each blocker device is manufactured using a stamping process. Stamping includes a variety of sheet-metal forming manufacturing processes, such as punching using a machine press or stamping press, blanking, embossing, bending, flanging, and coining. This could be a single stage operation where every stroke of the press produce the desired form on the sheet metal part, or could occur through a series of stages. The process is usually carried out on sheet metal, but can also be used on other materials, such as polystyrene.

The scanner 100 utilizes radio frequency signals to send and receive data to and from RFID cards during the scanning process. When those signals cannot be transmitted to or from the RFID cards 110, 112 and 114, the RFID cards cannot be scanned. The mechanism that prevents transmission of radio frequency signals through the material of the blocker devices 102, 104 is Gauss' law, which mandates that a conducting sphere does not allow electrical fields to be propagated into or out of the sphere. Surrounding, or partially surrounding, the RFID cards 110, 112 and 114 with the conducting material of the blocker devices 102, 104 has the same or similar effect as surrounding the RFID cards with a conducting sphere, i.e., radio frequency signals cannot be transmitted through the blocker devices, thereby preventing scanning of the RFID cards by a scanner 100.

Preferably, the size of each blocker device 102, 104 is substantially the size of a credit card, which is substantially 3 and 3/8 inch, by 2 and 1/8 inch by 0.02 inch. Preferably, the size of each blocker device 102, 104 is substantially a size that allows for insertion into a card slot or pocket, such as the pockets 402 found in wallet 400 (see FIG. 4) and pockets 502, 504 found in wallet 500 (see FIG. 5).

Figure 2:
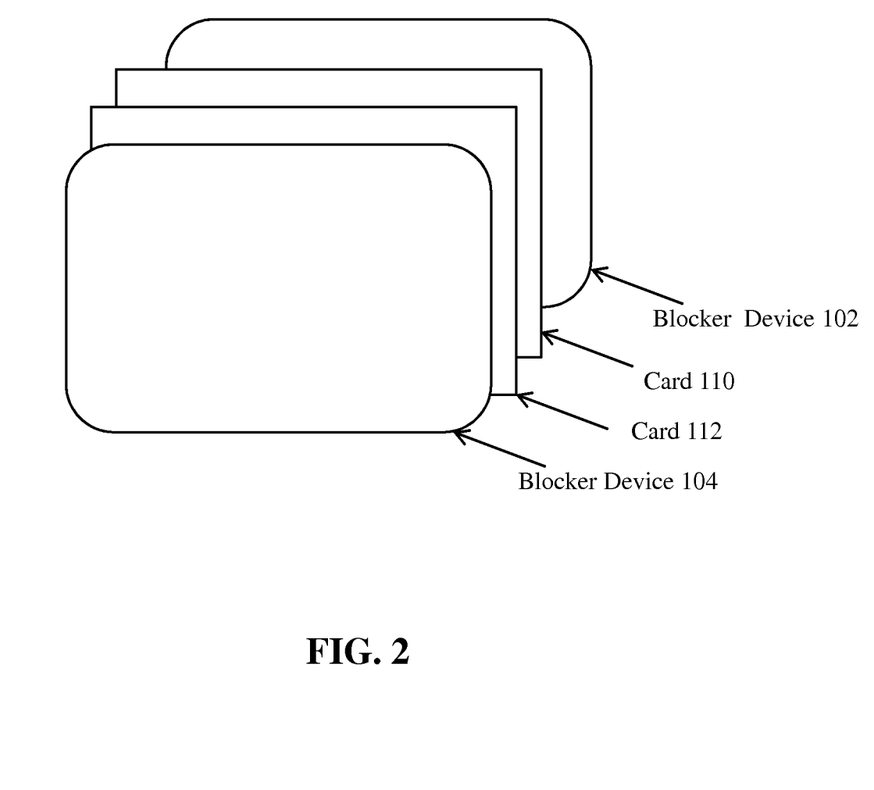
FIG. 2 is an illustration of a spatial configuration for using the scanner resistant device or devices for RFID cards, according to one embodiment of the present invention.
Figure 4:
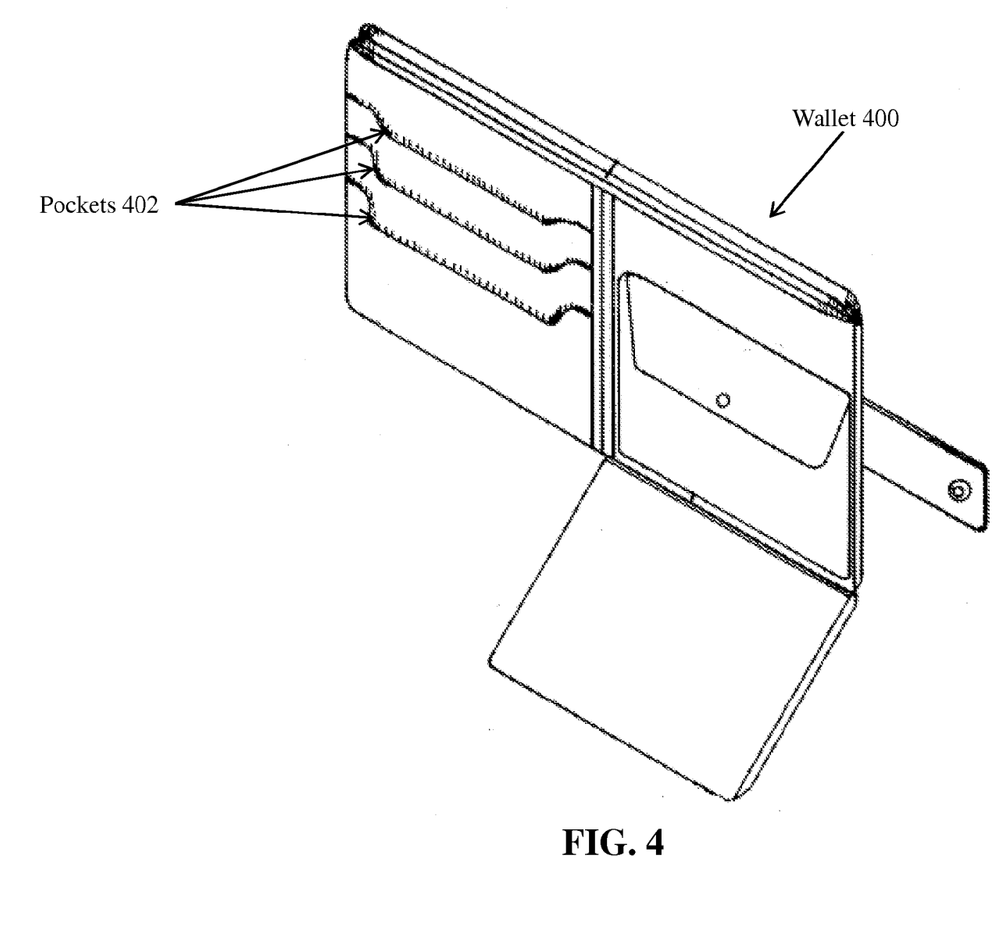
FIG. 4 is an illustration of a first wallet in which the scanner resistant device or devices for RFID cards may be used, according to one embodiment of the present invention.
Figure 5:
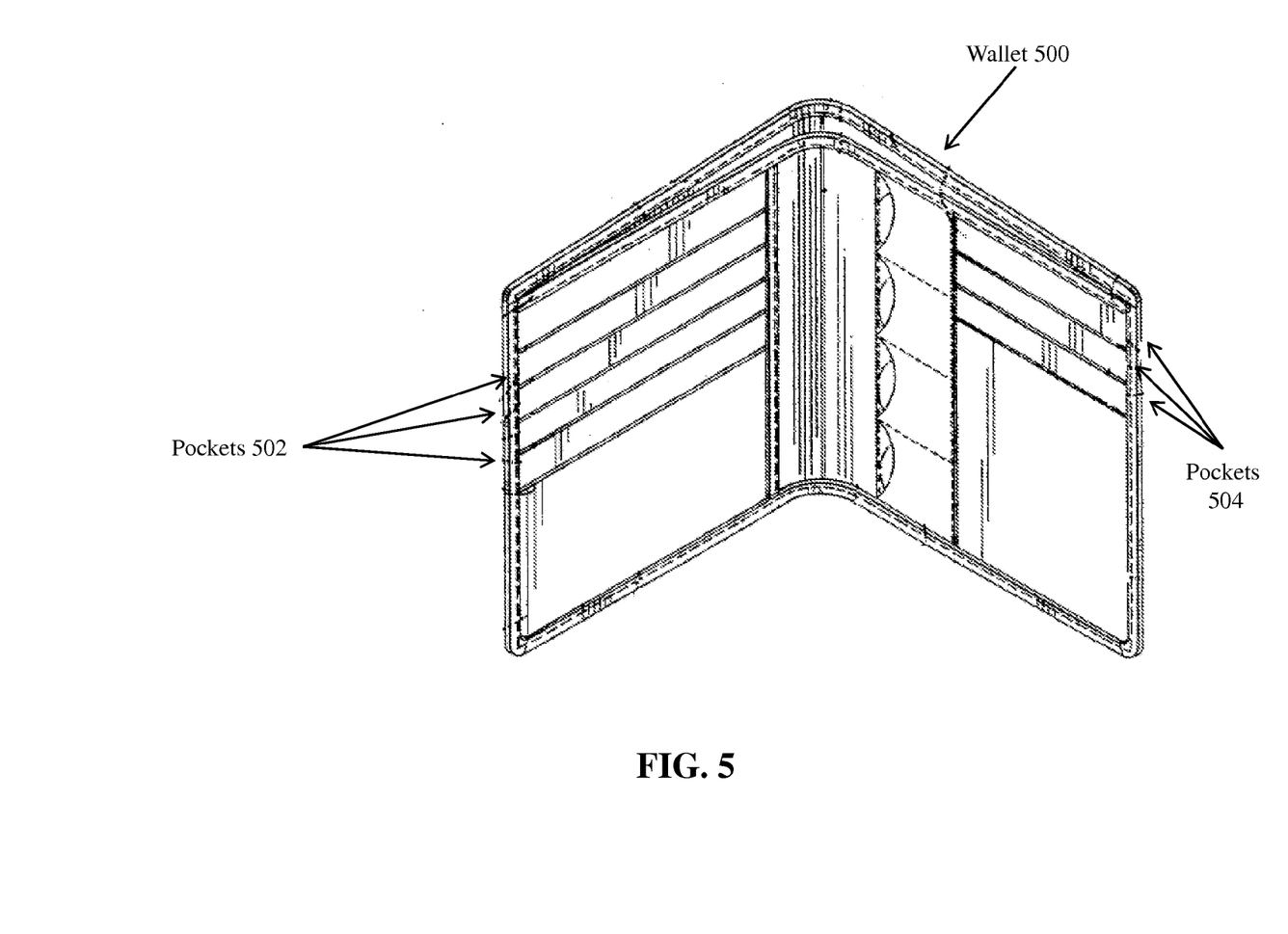
FIG. 5 is an illustration of a second wallet in which the scanner resistant device or devices for RFID cards may be used, according to one embodiment of the present invention.
Figure 6:
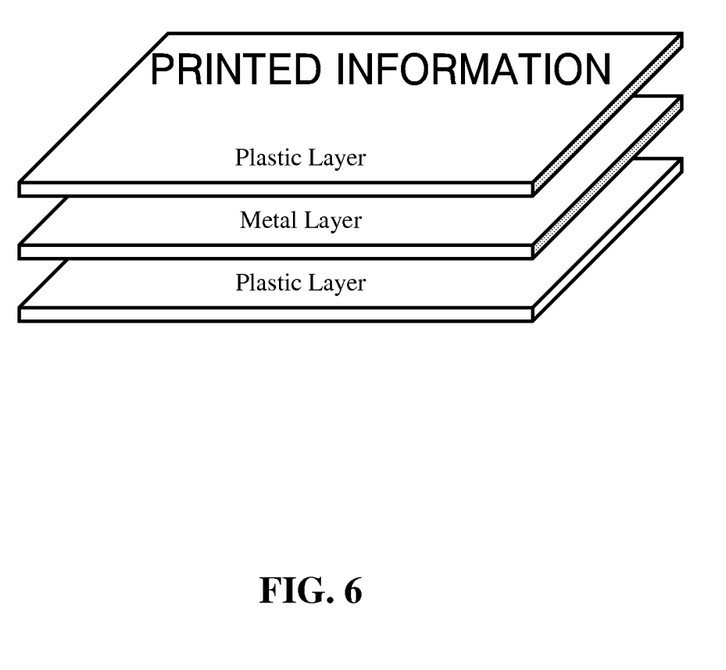
FIG. 6 is an illustration showing the various layers of the scanner resistant device comprising an interior metal layer laminated on both sides with a separate plastic layer, wherein at least one plastic layer shows printed information on an outward facing side, according to one embodiment of the present invention.
Figure 7:
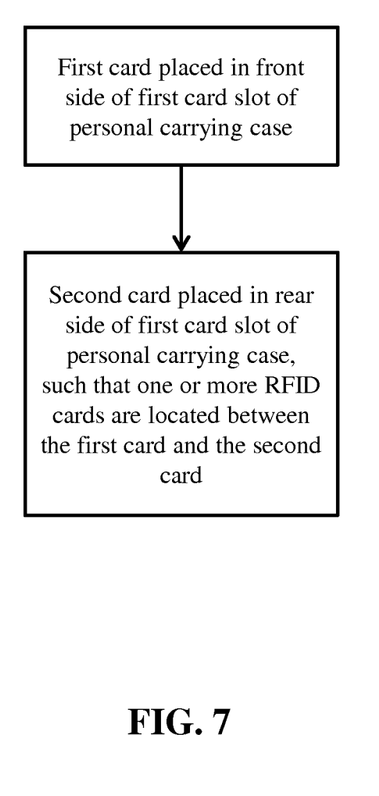
FIG. 7 is an illustration showing the method of placing multiple scanner resistant cards in a personal carrying case, so as to inhibit RFID scanning of RFID cards in the personal carrying case, according to one embodiment of the present invention.

FIG. 2 is an illustration of a spatial configuration for using the blocker devices 102, 104 for RFID cards 110, 112 and 114, according to one embodiment of the present invention. FIG. 4 is a frontal view, which shows the blocker devices 102, 104 in front of and behind the RFID cards 110, 112 and 114, so as to prevent scanning of the RFID cards by a scanner 100. Note that although the figures show two blocker devices in front of and behind a stack of two or three RFID cards, the present invention supports the use of only one blocker device, three blocker devices or any number of blocker devices to prevent the scanning of one, two or more RFID cards.

Figure 3:
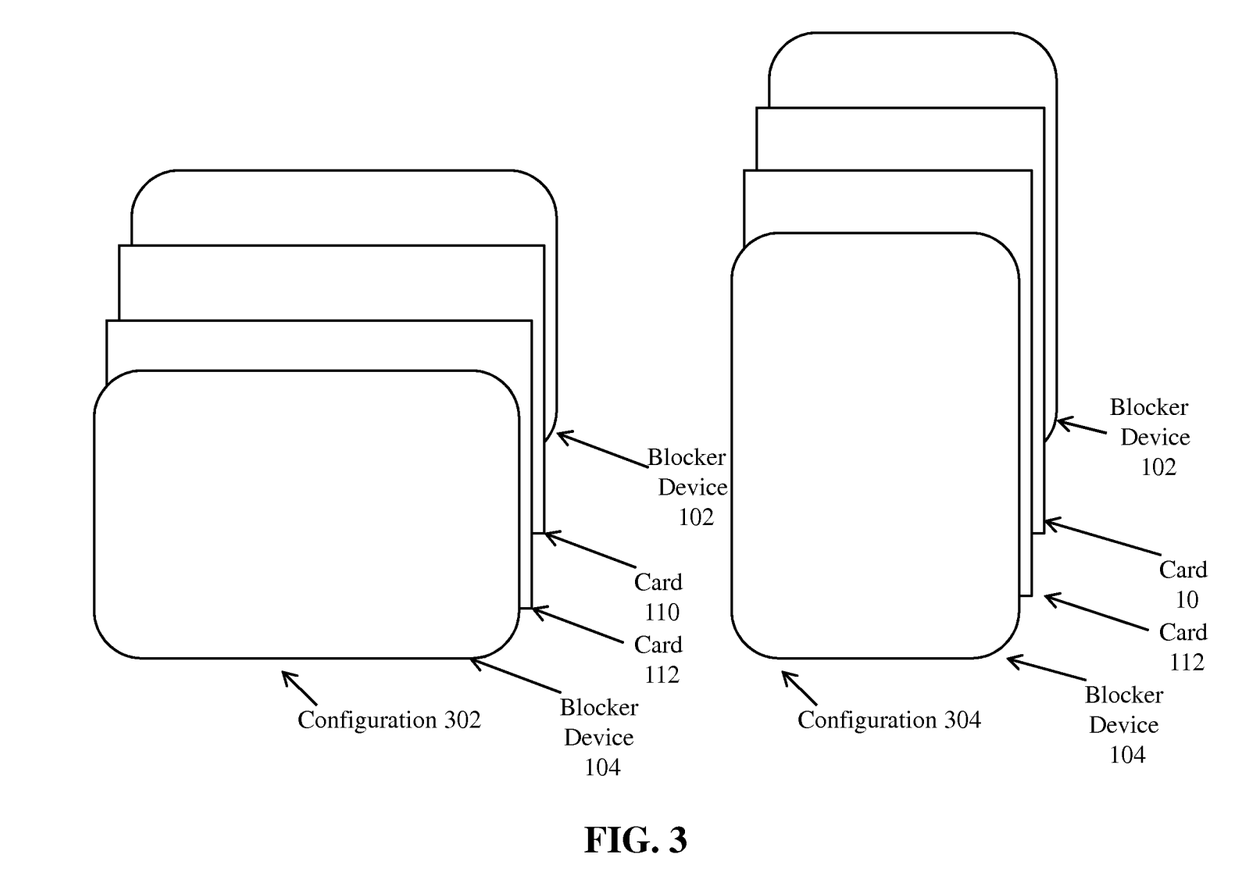
FIG. 3 is an illustration of two spatial configurations for using the scanner resistant device or devices for RFID cards, according to one embodiment of the present invention.

FIG. 3 is an illustration of two spatial configurations 302, 304 for using the scanner resistant device or devices 102, 104 for RFID cards 110, 112, according to one embodiment of the present invention. FIG. 3 shows configuration 302 which shows a set of rectangular cards stacked together and lying on their longest side, wherein the height of the cards is staggered one behind the other. Blocker device 104 is placed at the front of the stack while blocker device 102 is placed at the rear of the stack. In between blocker devices 102, 104 are RFID cards 110, 112. The placement of the RFID cards between the blocker devices prevents scanning of the information on the RFID cards.

The configuration 302 represents the relative position of the cards 102, 104, 110, 112 when used in a wallet such as wallet 400 (see FIG. 4) wherein the cards 102, 104, 110, 112 are placed in pockets 402 of the wallet. Note that pockets 402 comprise card slots that allow rectangular cards to be inserted lying on their longest side, wherein the height of the cards in the pockets 402 is staggered one behind the other to allow for easy access by the user. Additionally, the configuration 302 represents the relative position of the cards 102, 104, 110, 112 when used in a wallet such as wallet 500 (see FIG. 5) wherein the cards 102, 104, 110, 112 are placed in pockets 502 of the wallet. Note that pockets 502 also comprise card slots that allow rectangular cards to be inserted lying on their longest side, wherein the height of the cards in the pockets 502 is staggered one behind the other to allow for easy access by the user.

FIG. 3 shows configuration 304 which shows a set of rectangular cards stacked together and standing on their shortest side, wherein the height of the cards is staggered one behind the other. Blocker device 104 is placed at the front of the stack while blocker device 102 is placed at the rear of the stack. In between blocker devices 102, 104 are RFID cards 110, 112. The placement of the RFID cards between the blocker devices prevents scanning of the information on the RFID cards. The configuration 304 represents the relative position of the cards 102, 104, 110, 112 when used in a wallet such as wallet 500 (see FIG. 5) wherein the cards 102, 104, 110, 112 are placed in pockets 504 of the wallet. Note that pockets 504 comprise card slots that allow rectangular cards to be inserted standing on their shortest side, wherein the height of the cards in the pockets 504 is staggered one behind the other to allow for easy access by the user.

Experimental results from testing of the present invention are hereby provided. Testing occurred in August 2011 on a blocker device substantially the size of a credit card, i.e., 3 and ⅜ inch, by 2 and ⅛ inch by 0.02 inch. A commercially available RFID scanner operating at 13.56 MHz was used at a distance of 50 mm from the blocker device. In each test, a different configuration of blocker devices together with RFID cards in a wallet was used (see FIG. 3). All of the following configurations resulted in no reading of any data from any of the RFID cards in the configuration: 1) a single blocker device in front of a single RFID card in a set of pockets similar to pockets 402 in a wallet similar to wallet 400 (see FIG. 4); 2) a configuration similar to configuration 304, wherein blocker devices were placed on either end of a stack of cards including one or two RFID cards in a set of pockets similar to pockets 504 in a wallet similar to wallet 500 (see FIG. 5); 3) a configuration similar to configuration 302, wherein blocker devices were placed on either end of a stack of cards include one or two RFID cards in a set of pockets similar to pockets 402 in a wallet similar to wallet 400 (see FIG. 4); 4) a configuration similar to configuration 304, wherein blocker devices were placed on either end of a stack of cards including one or two RFID cards, and wherein a third blocker device was inserted in the middle of the pack of cards, wherein the entire set of blocker devices and RFID cards was placed in a set of pockets similar to pockets 504 in a wallet similar to wallet 500.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

We claim:

1. A device for preventing radio frequency scanning of a card, comprising:
    a rectangular-shaped planar element sized for fitting within a card slot of a personal carrying accessory, wherein the planar element is substantially from about 3 and ⅜ inches in length, to about 2 and ⅛ inches in height and about 0.02 inch in depth, and wherein the planar element is composed of a top layer of plastic material, a middle layer of a metallic foil that inhibits the transmission of radio frequency signals, and a bottom layer of plastic material, wherein the top layer and the bottom layer of plastic material completely cover a surface area of both sides of the middle layer, as well as all edges of the middle layer, and wherein an outward surface of the top layer includes printed information.

2. The device of claim 1, wherein the middle layer comprises a dielectric material.

3. The device of claim 2, wherein the middle layer comprises a metal alloy.

4. The device of claim 3, wherein the middle layer comprises a laminated metal.

5. The device of claim 4, wherein the middle layer comprises any one of tin, copper, nickel, chromium, or stainless steel.

6. A system for preventing radio frequency scanning of a card, comprising:
    a personal carrying case comprising a plurality of card slots for inserting cards;
    a card including information that may be scanned via a radio frequency scanner;
    a first rectangular-shaped planar element located within a first card slot of the personal carrying case such that the first planar element is located substantially on a front side of the personal carrying case, wherein the planar element is sized for fitting within a card slot of the personal carrying case, wherein the planar element is substantially from about 3 and ⅜ inches in length, to about 2 and ⅛ inches in height and about 0.02 inch in depth, and wherein the planar element is composed of a top layer of plastic material, a middle layer of a metallic foil that inhibits the transmission of radio frequency signals, and a bottom layer of plastic material, wherein the top layer and the bottom layer of plastic material completely cover a surface area of both sides of the middle layer, as well as all edges of the middle layer, and wherein an outward surface of the top layer includes printed information; and
    a second rectangular-shaped planar element located within a second card slot of the personal carrying case such that the second planar element is located substantially on a rear side of the personal carrying case, and wherein the second planar element shares the same characteristics of the first planar element.

7. The system of claim 6, wherein a plurality of cards are located between the first planar element and the second planar element within the personal carrying case.

8. A method for preventing radio frequency scanning of a card, comprising:
    placing a first rectangular-shaped planar element within a first card slot of a personal carrying case such that the first planar element is located substantially on a front side of the personal carrying case, wherein the planar element is sized for fitting within a card slot of the personal carrying case, wherein the planar element is substantially from about 3 and ⅜ inches in length, to about 2 and ⅛ inches in height and about 0.02 inch in depth, and wherein the planar element is composed of a top layer of plastic material, a middle layer of a metallic foil that inhibits the transmission of radio frequency signals, and a bottom layer of plastic material, wherein the top layer and the bottom layer of plastic material completely cover a surface area of both sides of the middle layer, as well as all edges of the middle layer, and wherein an outward surface of the top layer includes printed information; and
    placing a second rectangular-shaped planar element within a second card slot of the personal carrying case such that the second planar element is located substantially on a rear side of the personal carrying case, and wherein the second planar element shares the same characteristics of the first planar element.

9. The method of claim 8, wherein a plurality of cards are located between the first planar element and the second planar element within the personal carrying case.

10. The method of claim 9, wherein the middle layer comprises a dielectric material.

11. The method of claim 10, wherein the middle layer comprises a metal alloy.

12. The method of claim 11, wherein the middle layer comprises a laminated metal.

13. The method of claim 12, wherein the middle layer comprises any one of tin, copper, nickel, chromium, or stainless steel.

* * * * *